US005144343A

United States Patent [19]

Oba et al.

[11] Patent Number: 5,144,343

[45] Date of Patent: Sep. 1, 1992

[54] IMAGE RECORDING METHOD AND APPARATUS

[75] Inventors: Sayoko Oba; Kenji Okuna; Katsumi Muroi, all of Ibaraki; Katsubumi Ouchi, Chigasaki; Tsutomu Iimura, Tachikawa; Ryoji Kojima, Katsuta, all of Japan

[73] Assignees: Hitachi Ltd.; Hitachi Metals, Ltd.; Hitachi Koki Co., Ltd., all of Tokyo, Japan

[21] Appl. No.: 541,313

[22] Filed: Jun. 21, 1990

[30] Foreign Application Priority Data

Jun. 21, 1989 [JP] Japan ................................ 1-156793

[51] Int. Cl.$^5$ .......................................... G01D 15/06

[52] U.S. Cl. .............................. 346/155; 346/160.1

[58] Field of Search .................. 346/153.1, 155, 160.1

[56] References Cited

U.S. PATENT DOCUMENTS 4,118,710 10/1978 Tomita et al. .................. 346/155 X
4,590,496 5/1986 Toyono et al. ................. 346/155 X
4,763,143 8/1988 Ohba et al. .................. 346/153.1 X
4,777,499 10/1988 Okuna et al. .................. 346/155 X
4,831,394 5/1989 Ochiai et al. .................. 346/155 X
4,873,540 10/1989 Asanae et al. .................... 346/153.1

*Primary Examiner*—George H. Miller, Jr.
*Attorney, Agent, or Firm*—Antonelli, Terry Stout & Kraus

[57] ABSTRACT

An image recording apparatus including a recording electrode having electrode needles aligned in columns, a driving circuit for individually applying an image recording voltage to the electrode needles of the recording electrode, a recording medium composed of a conductive layer and a surface insulating layer, and a voltage circuit for applying a predetermined voltage between the recording medium and the electrode needles, whereby fog on the recorded image can be avoided.

6 Claims, 7 Drawing Sheets

IMAGE RECORDING METHOD AND APPARATUS

CROSS-REFERENCE TO RELATED APPLICATIONS

The present application relates to a U.S. patent application Ser. No. 420,480 filed Oct. 12, 1989, how U.S. Pat. No. 4,977,415 entitled "ELECTROSTATIC RECORDING HEAD, IMAGE RECORDING APPARATUS, DEVELOPING AGENT SUPPLYING DEVICE, DISPLAY DEVICE AND METHOD OF PRODUCING ELECTROSTATIC RECORDING HEAD" by Sayoko OHBA et al. and to a U.S. filed Jun. 25, 1990, now U.S. Pat. No. 5,021,810 entitled "PRINTING MACHINE" filed by Katsumi MUROI et al. an of claiming priority of Japanese Patent application No. Hei-01-193353, the disclosures of which are hereby incorporated by reference.

BACKGROUND OF THE INVENTION

The present invention relates to an image recording apparatus and more particularly to an image recording apparatus and method for forming images on a recording medium using toners.

Image recording methods and apparatus for forming images on a recording medium using toners are well known. One of these techniques is to form toner images on a recording medium by supplying electrically conductive, magnetic toners in a gap area between the recording medium and an recording electrode and applying a voltage to the recording electrode. Such a technique is disclosed in U.S. Pat. No. 4,763,143 issued to Ohba et al, U.S. Pat. No. 4,777,499 issued to Okuna et al, JP-A-53-6,043 and JP-A-64-14,050.

The technique of forming images by supplying electrically conductive, magnetic toners in a recording area formed between a recording electrode and a recording medium and applying a voltage corresponding to the image to be recorded results not only in toners being relatively strongly adhered to the recording medium for image formation but also in toners (commonly referred to as 'non-image toners') being relatively weakly deposited thereon. These strongly adhered toners shift downstream due to movement of the recording medium as they are deposited on the recording medium and are duplicated on the recording medium (paper) at a duplication section; however, the latter toners (i.e. the non-image toners) cause background dirt and fog, which deteriorates the image quality. To obviate this, the above prior art intends to remove the unnecessary toners not contributing to image formation from the recording medium and to collect them for subsequent image recording. More specifically, the unnecessary toners, other than the toners relatively strongly adhered to the recording medium for image formation, are removed from the recording medium arranged apart from the recording medium by magnetic means, such as a magnetic brush and a magnetic roll, and are collected in a hopper.

The above technique of collecting unnecessary toners using the magnetic means is preferable to relatively easily lessen the fog and dirt of the image background due to the unnecessary toners.

However, in an actual image recording, it is difficult to completely eliminate fog and background dirt. The strong action of the magnetic field generated by the magnetic means in order to completely eliminate fog and background dirt will remove the toners used for image formation from the recording medium and thus will result in insufficient image density.

SUMMARY OF THE INVENTION

An object of the present invention is to provide an image recording method and apparatus which can reduce fog and also give sufficient image density to record clear images.

Another object of the present invention is to solve the problem of voltage difference between the electrodes and the recording medium in an image recording apparatus.

In accordance with the present invention, there is provided an image recording apparatus comprising electrode needles, a recording medium, and voltage applying means provided between the electrode needles and the conductive layer of the recording medium for applying a small voltage difference.

The image recording apparatus according to the present invention comprises means for applying a voltage, having a certain potential level measured from the potential applied to non-image recording electrode needles, to the conductive layer of a recording medium.

In operation, conductive toners are transferred in contact with the recording medium or the recording electrode by a magnetic field or movement of the recording medium. Although the conductive toners are conductors macroscopically, they are microscopically resin insulators mixed with conductors of powder such as carbon; the conductor powder serves to neutralize charges generated in the resin so that the entire conductive toners produce a minor frictional charge having a positive or negative polarity determined by the frictional charging order owing to the above toner transferring action.

This frictional charge is as small as $-3$ V to $+3$ V in terms of the surface potential measured from the conductive layer of a recording medium. However, the system in which a recording electrode supplies charges to the conductive toners to record images suffers from the influence of such a small potential change on the images because of its low recording voltage of 30 to 60 V.

In accordance with the present invention, the voltage applying means can set the potential applied to the non-image recording electrode needles to a certain level which is measured from the potential at the conductive layer of the recording medium. If this potential level is set so that its polarity is opposite to the charging polarity of the conductive toners and its absolute value is equal to the surface potential due to the friction of the conductive toners, the frictional charging charge of non-image toners will be neutralized by the charge injected through the non-image recording electrode needles. Therefore, the non-image toners lose electrostatic adhesive force for the recording medium and so can be removed from the recording medium by smaller force than in the prior art, thereby improving the image density to provide clear images.

DESCRIPTION OF THE PREFERRED EMBODIMENTS

Figure 1:
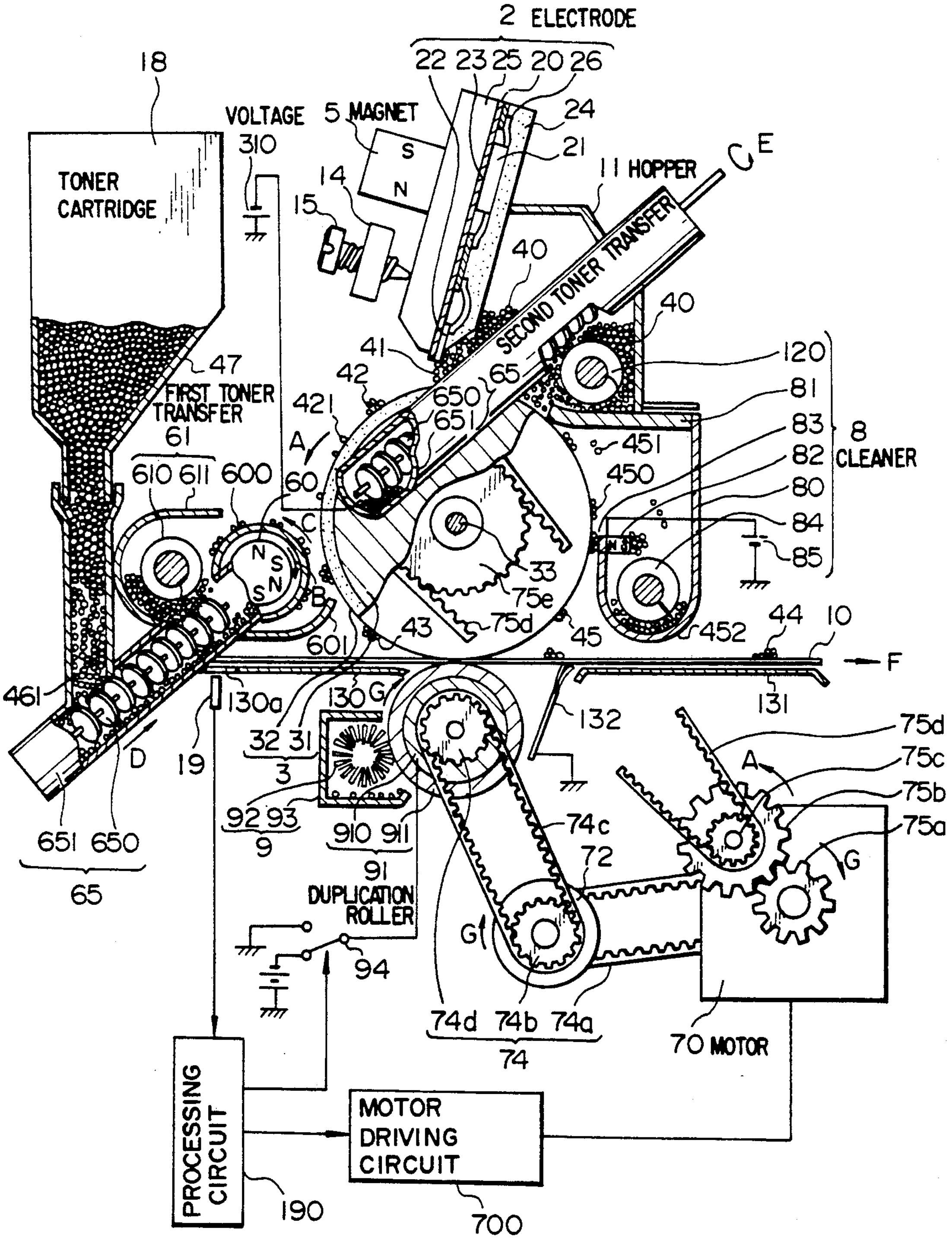
FIG. 1 is a sectional view of the image recording apparatus according to one embodiment of the present invention.

Now referring to the drawings, the present invention will be explained in connection with its embodiments.

FIG. 1 is a sectional view of the image recording apparatus according to one embodiment of the present invention. A recording medium 3, which comprises a conductive layer 31 and an insulating layer 32, has a cylindrical shape extending in the direction orthogonal to paper and a length capable of executing recording of e.g. A4 size or B4 size. 310 is biasing voltage applying means for applying a voltage of several volts to the conductive layer 31; in FIG. 1, it is a D.C. power source for applying a negative voltage. The recording medium 3, rotatably set around its center shaft, is driven at a constant speed in the direction of arrow A by a motor 70. A stick heater 33 is installed in a bore having a diameter of e.g. 3 to 10 mm at the center of the recording medium 3. Such a recording medium is disclosed in U.S. Pat. No. 3,533,920 issued for C. P. Cobino. The recording medium 3 is fabricated as follows. A cylinder of aluminum or aluminum alloy is mirror-treated on its periphery, and the cylinder surface is alumenized steel, hard alumenized steel, anode-oxidized, hard aluminum oxide, or porous hard aluminum oxide and is impregnated with resin polytetrafluoroethylene so as to provide the insulating layer 32 having a thickness of 2 to 100$\mu$ or so.

An electrode 2 is inclinedly positioned across a gap from the recording medium 3. The electrode 2 is inclined so that the tip of its electrode needle 22 is inclined downstream of movement of the recording medium 3 and its inclination angle is usually 5 to 70 degrees from the direction orthogonal to the drum surface The inclination angle is selected to be optimum in accordance with the strength, size, setting position of a magnet 5. In this embodiment, it is about 15 degrees. The magnet 5 is located at a suitable position in accordance with its size and strength. A toner chain is formed owing to the magnetic field generated by the magnet. In order to hold the coupling force between the toner in the toner chain at a certain strength, the setting position, size and strength of magnet 5 are selected to provide a comparatively strong magnetic field to the needle of the electrode needle 22. Too weak a strength of the magnetic field is not preferable to form the toner chain at a predetermined position for the toner transferring force produced when the recording medium moves downstream. On the contrary, too strong a strength of the magnetic field results in insufficient recording unless a large voltage is applied for recording.

Further, it is important for provision of a desired image to maintain the gap between the electrode 2 and the recording medium 3 constant over the entire width. Image quality deterioration due to variation of the gap, can be reduced by possibly increased dimension of the gap, thereby to decrease the ratio of gap variation; this is also preferred in making and adjusting the gap. However, the increased dimension of the gap between the electrode and the recording medium results in image quality deterioration due to expansion of the toner chain formed by the magnetic field. This can be prevented by arranging the magnet at a position remote from the electrode tip as far as possible. This is because arranging the magnet at the remote position stabilizes the direction of a magnetic force line, and so that of the toner chain formed along the magnetic force line. Additionally, arranging the magnet at a further position from the electrode tip weakens the coupling force between the toners in the toner chain so that the strength of the magnet should be increased as it is away farther from the electrode tip.

Components of the recording electrode 2 will be explained. Reference numeral 20 is a substrate made of non-magnetic insulator (e.g. ceramics and epoxy resin). Formed on the substrate 20 are a strip wire pattern of conductive material 23, electrode needles 22 of conductive material (preferably, a magnetic conductor) arranged in a column over the recording width on the lower end of the substrate in the direction perpendicular to the paper, and a driving IC 21 for applying to the individual electrode needles 22 a recording voltage which is an electric signal corresponding to the image pattern to be recorded. The terminals of the IC 21 are connected with the strip wire pattern 23 through e.g. solder; the strip wire pattern 23 is connected with the electrode needles 22 by bonding wires 26. The substrate 20, on the side where the electrode needless are arranged, is covered with a protection member 24 of insulating non-magnetic material except for the tips of the electrode needles. Provided on the opposite side of the substrate 20 is a heat sink plate 25. Provided on the heat sink plate 25, on its surface opposite to the substrate, the magnet 5 is located far from the electrode needles 22; this magnet is arranged over the recording width in the direction perpendicular to the paper.

Provided at the center of the recording width direction of the electrode 2 is a pressing member 15 which is engaged with a supporting member 14 fixed to the recording apparatus body; the pressing member 15 serves to press the electrode 2.

Reference numeral 11 is a hopper which is a vessel for containing toners. Toner 40, which is electric and also magnetic, is put in the hopper 11. Reference numeral 120 is a rotary screw for agitating the toner 40 to distribute the toners uniformly over the recording width Reference numeral 41 depicts toner aligned between the electrode needles 22 and the insulating layer 32 of the recording medium 3. Reference numerals 42 and 421 depict toner adhered to the recording medium 3.

Reference numeral 60 is a magnetic roll for removing excess toners on the recording medium 3. The magnetic roll 60 is provided at the position which is above the outer periphery of the recording medium 3 and more downstream in the rotating direction of the recording medium 3 than the electrode 2. The magnetic roll 60, which is accommodated within a sleeve 600, is adapted to be rotatable in the direction of arrow B as shown. The sleeve 600 is separated by with a small gap from the recording medium 3. The dimension of the gap is selected to be a suitable value in accordance with the magnetic characteristic of the magnetic roll 60. Reference numeral 601 is a toner tray. Reference numeral 61 is the first toner transferring means for transferring the toner from rear to front of the paper in parallel to the recording medium; the first toner transferring means 61 is provided close to the magnetic roll and sleeve 600. The first toner transferring means 61 mainly comprise a rotary screw 610 and a cover 611. Reference numeral 65 is a second toners transferring means for transferring the toner toward the hopper 11 using mechanical means in the direction of arrow D as shown in the direction substantially perpendicular to that in the first toner transferring means 61. The second toner transferring means 65 mainly comprises a pipe 651 and a screw 650 which is driven in the direction of arrow E by mechanical driving means (not shown). The second toner transferring means 65 is connected, at its lower end, with a toner cartridge 18 in which toner 47 is contained.

Reference numeral 10 is a recording paper or duplication member which is transferred in the direction F. Reference numerals 130 and 131 are guides for the duplication member. Reference numeral 19 is a sensor for sensing the presence or absence of the duplication member 10. The guide 130 is provided with an opening 130*a* for operation of the sensor 19. Reference numeral 190 is a processing circuit (e.g. microcomputer) for executing the operation and output of a control signal in response to the output signal from the sensor 19. Reference numeral 132 is an electricity-removal brush for removing static electricity from the duplication member 10, and is provided an inclined manner along the moving direction of the duplication member 10.

Reference numeral 9 is duplication means for duplicating the image toners on the recording medium 3 on the duplication member 10. Duplication means 9 is provided at a position which is above the outer periphery of the recording medium 3 and more downstream in the rotating direction of the recording medium 3 than the magnetic roll 60. The duplication means 9 is composed of a duplication roller 91, a rotatable hair brush 92, a vessel 93 for enclosing the hair brush, and a pressing mechanism (not shown) for pressing the duplication roller 91 against the recording medium 3. Duplication roller 91 is composed of a rigid rodlike roller 910 of conductive or insulating material and an elastic layer 911 of an elastic conductor or insulator having a high friction coefficient. The duplication roller 91 and the recording medium 3 are driven by the same motor 70 so that they rotate in directions reverse to each other through duplication roller moving power transmission means 74 and recording medium moving power transmission means 75, respectively. The motor 70 rotates in the direction of arrow G. The rotational motion of the motor 70 can be changed into motion in the direction of arrow A by a gear 75*a* which is coaxial with the motor shaft and a gear 75*b* in engagement with the gear 75*a*. The moving power transmitted to the gear 75*b* is transmitted from a timing pulley 75*c* coaxial with the gear 75*b* to a timing pulley 75*e* coaxial with the driving shaft of the recording medium 3 through a timing belt 75*d*. Thus, the recording medium 3 is driven in the direction of arrow A.

Also, the moving power of the motor 70 is transmitted from the timing pulley (not shown) coaxial with its motor shaft to the timing pulley (not shown) coaxial with a friction clutch 72 through a timing belt 74*a*. Thus, the friction clutch 72 is rotated in the direction of arrow G. Further, the moving power transmitted to the friction clutch 72 is transmitted from a timing pulley 74*b* coaxial with the friction clutch 72 to a timing pulley 74*c* coaxial with the duplication roller 91 through a timing belt. Thus, the duplication roller 91 is driven in the direction of arrow G.

Reference numeral 94 is a circuit for switching the duplication voltage. Reference numeral 700 is a motor driving circuit.

Reference numeral 8 is cleaning means for removing toner 45 left on the recording medium 3; this cleaning means 8 is provided at a position which is above the outer periphery of the recording medium 3 and more downstream in the rotating direction of the recording medium 3 than the duplication means 9. The cleaning means 8 is composed of a box 80 for receiving the removed toners; a cleaning blade 81 provided at one end of the box 80; a permanent magnet 82; a toner applying electrode 83 integral along the recording width, which is always supplied with a voltage by a D.C. power supply 85; and a rotary screw 84.

The operation of the image recording apparatus according to this embodiment will be explained below.

First, the toner cartridge 18 is mounted in the apparatus. The toner 47 in the cartridge 18 is supplied onto the screw 650 of the second toner transferring means 65 by the action of gravity. The toner 461 is transferred against gravity by the mechanical means (i.e. rotation of the screw 650 within the pipe 651 in the direction of arrow E) from bottom to top of the second toner transferring means 65 to reach the hopper 11.

The toner 40 is transferred from front to rear of the paper by rotation of the screw 120 to uniformly distribute the toner in the hopper 11 over the recording width.

Rotation of the recording medium 3 supplies the toner 40 in the hopper 11 to the gap formed between the electrode 2 and the recording medium 3. The static magnetic field of the magnet 5 acts on the gap between the tip of the electrode needles 22 and the recording medium 3. The gap can be easily fabricated if it is wider, but the gap is desired to be narrower in view of image quality. The gap should be uniform over the recording width; to this end, the pressing member 15 intends to correct any curve of the electrode 2.

The static magnetic field of the magnet 5 aligns the toner 41 in contact with the electrode needles 22 and the surface of the recording medium 3.

Part of the aligned toner 41, under the action of rotation of the recording medium 3 and of supply of the toner, is weakly deposited on the recording medium 3 with its rotation owing to the physical adsorption force such as the Van der Waals attraction and the electrostatic adhesive force due to frictional charging. Thus, like the toner 421, the toner is transferred in the direction of rotation of the recording medium 3.

Applying through the IC 21 a recording voltage as low as e.g. positive several tens of volts or so to the plural electrode needles 22 for creating an image in accordance with an image signal injects a positive charge into the toner in contact with the electrode needles 22 applied with the recording voltage. The positive charge mainly distributes on the side of the recording medium 3. Also, a negative charge is are induced at the boundary between the conductor layer 31 and the insulating layer 32. Thus, the toner injected with the charge strongly adheres to the recording medium 3 by electric force. Under the action of rotation of the recording medium 3 and of supply of toner, the toner is transferred in the rotating direction of the recording medium 3, like the toner 42.

Then, toner is immediately supplied from upstream of the movement of the recording medium 3 to create the aligned toner 41 again. The shape of the aligned toner 41 and its position in contact with the recording medium 3 are held substantially constant. The toner 41 aligned in a dynamically stabilized manner adheres to the recording medium 3 so that the toner image can be formed stably on the recording medium at a high speed.

On the other hand, some of the electrode needles 22 which do not serve to record an image according to an image signal (i.e. those that serve to record the image corresponding to the background) are supplied with the voltage of volts. This means that the toner corresponding to these electrode needles has been applied with a slightly positive voltage on the basis of the potential at the recording medium since a negative potential has been applied to the recording medium by the voltage applying means 310. The positive charge thus produced can cancel the frictional electricity charge generated in the toner if its have a negative polarity. The influence of the frictional electricity on the non-image toner 421 can be eliminated.

Thus, the weakly deposited toner 421 serving to form the non-image portion, which does not substantially suffer from the frictional electricity, can be easily selectively removed from the recording medium 3 by the action of centrifugal force due to rotation of the recording medium 3, gravity, or magnetic attraction force of the magnetic roll 60. Accordingly, since the weakly deposited toner can be removed when it passes the magnetic roll, only the remaining strongly adhered toner 43 will form a toner image for development. The removed toner 421 is transferred in the direction of arrow C by rotation of the magnetic roll 60 onto the screw 610. Together with the toners supplied from the toner cartridge 18, it is uniformly returned for reusing into the hopper 11 through the screws 650 and 120.

Sequentially, the toner 42 strongly adhered to the recording medium 3 when the recording voltage is applied to the corresponding electrode needles 22 provide the development image 43.

The development image 43 is duplicated on the duplication member 10 by the duplication means 9 to provide a duplication image 44. The process of forming the duplication image 44 on the duplication member 10 will be explained below. The recording medium 3 and the duplication roller 91 are driven by the same motor through the recording medium power transmission means 75 and the duplication roller power transmission means 74, respectively. The circumferential velocities of the recording medium 3 and the duplication roller 91 are set by mechanical means such as gears and pulleys so that that of the former is higher than that of the latter. The frictional clutch 72, which generates slip at both ends of its shaft when transmitted power exceeds a certain value, is inserted in the duplication roller power transmission means 74 located between the motor 70 and the duplication roller 91. During the time when the duplication member 10 is inserted between the duplication roller 91 and the recording medium 3, the duplication roller 91 is pressed to be directly brought into contact with the recording medium 3.

The presence of the elastic layer 911, having a high friction coefficient on the surface of the duplication roller 91, generates a large frictional force between the recording medium 3 and duplication roller 91 to transmit moving power from the recording medium 3 to the duplication roller 91. Since the circumferential velocity of the duplication roller 91 is lower than that of the recording medium 3, moving power intending to rotate the duplication roller 91 at a velocity exceeding a set value is produced. Eventually, the duplication roller 91 is disconnected from the motor 70 by the friction clutch and so rotated at the same circumferential velocity as that of the recording medium (drum) 3. When the duplication member 10 is inserted between the duplication roller 91 and the recording medium 3, slip is generated between the recording medium 3 and the duplication roller 91 in accordance with the difference in the circumferential velocities set therefor. This is because the friction coefficient between the duplication roller 91 and the duplication member 10 is much larger than that between the recording medium 3 and the duplication member 10 so that large power is not transmitted from the recording medium 3 to the duplication roller 91. Therefore, the toner 43 constituting the development image 43 deposited on the recording medium 3 is subjected to mechanical tearing-off force at contact points between the recording medium 3 and the duplication member 10. This tearing-off force, which is much larger than the electric force serving to deposit the development image on the recording medium 3, duplicates or transfers most of the toner on the recording medium 3 onto the duplication member 10 to provide a duplication image 44.

Additionally, application of the duplication voltage reverse to the polarity of the recording voltage to the duplication roller 90 through switching circuit 94 while the duplication member 10 is being inserted between the duplication roller 91 and recording medium 3 results in more efficient duplication since the toner of the development image 43 is subjected to electric attraction force toward the duplication member 10. In this case, it should be noted that the rigid roller 910 and elastic layer 911 are made of electrically conductive material (e.g., $10^2$ Ω.cm–$10^{10}$ Ω.cm). The mechanical tearing-off force and the electrical attraction force duplicate most of the toner of the development image 43 onto the duplication member 10 to provide the duplication image 44. Then, a small amount of toner left on the recording medium 3 without being duplicated on the duplication member 10 will be transferred as remaining toner, as it is deposited on the recording medium 3, with movement or rotation of the recording medium 3. On the other hand, the duplication image 44 is fixed onto the duplication member 10 by fixing means such as known thermal fixing means and pressure fixing means (not shown).

The remaining toner 45 on the recording medium 3 which was not duplicated on the duplication member 10 is transferred to the neighborhood of toner application electrode 83 with the aid of rotation of the recording medium 3. The toner application electrode 83 is positioned with a slight gap from the recording medium 3. The static magnetic field action of permanent magnet 82 collects the remaining toner between the surface of the recording medium 3 and the toner application electrode 83. The toner application electrode, which is applied with e.g. several tens of volts or so, injects a positive charge into the remaining toner to generate an electric attraction force between it and the charge having an opposite polarity induced on the recording medium 3. This electric attraction force adheres the toner on the recording medium 3 again. The toner 450 adhered again is transferred with rotation of the recording medium 3 and scraped off the recording medium 3 by cleaner blade 81 which is kept in contact with the recording medium 3 by pressure. Most of the toner 450 is received in box 80. The toners scraped off by the cleaner blade, but not received in the box 80 and dropped between the recording medium 3 and the toner application electrode 83 serve as part of the toner to be collected between the recording medium 3 and the toner application electrode 83 and so does not pollute the duplication member 10. The toner 452 received in the box 80 is transferred with rotation of the screw 84 and collected by a disposal toner bottle (not shown); the collected toner is eventually discarded.

Meanwhile, the time when the toner cartridge 18 is to be exchanged can be determined by detecting the amount of the toner 461 in the pipe 651, using a toner sensor (not shown) provided in the pipe. Setting the reaction level in the toner for two values permits a warning to be first issued for a user and thereafter the exchanging time to be notified to user.

Explanation will be given for the flow from the deposition of toner on the recording medium to the duplication thereof on the duplication member.

Toner is supplied from the toner cartridge 18 provided at the lower part of the second toner transfer means 65 into the hopper 11 with the aid of the screw 650. When under this state, the duplication member 10 is transferred to the position of the sensor 19 along a guide 130 and sensed by the sensor 19, the motor 70 is driven at a predetermined speed through a driver circuit 700, and also the recording voltage according to an image signal is applied to the electrode needles 22 to start the recording operation. Then, the duplication roller 91 is driven at the same circumferential velocity as the velocity Vd of the recording medium 3 by the action of the friction clutch 72 mentioned above. The sensor 19 is provided at such a position that the time required for the recording medium to travel from the position corresponding to the electrode 2 to its position brought into contact with the duplication roller 91 is equal to the time required for the duplication member 10 to travel from the position corresponding to the sensor 19 to the contact point between the duplication roller 91 to the recording medium 3. Therefore, the motor 70 rotates to start the recording operation at the same time as the duplication member 10 is sensed by the sensor 19; the development image 3 on the recording medium 3 reaches in its tip the contact point between the duplication roller 91 and the recording medium 3 when the duplication member 10 reaches there. Thus, duplication can be made from the tip of the recording medium 91.

When the duplication member 10 is caught between the recording medium 3 and the duplication roller 91, the circumferential velocity of the duplication roller 91 reaches a setting value Vt (<Vd) by the action of the friction clutch 72 as described above, and thus the duplication member 10 is transferred at the velocity Vt. Further, when the duplication member 10 reaches the position corresponding to the sensor 19 and so is sensed by the sensor 19, an output signal processing circuit 190 incorporating a timer for the sensor 19 starts a count operation; the switching circuit 94 is driven at the same time as the duplication member 10 is caught between the recording medium 3 and the duplicating roller 91 to apply the voltage having a polarity opposite to that of the recording voltage to the duplication roller 91. The signal processing circuit 190 continues the count operation to drive the switching circuit 94 immediately before the duplication member leaves the contact point between the recording medium 3 and the duplication roller 91 thereby cutting off the voltage applied to the duplication roller 91.

Although the duplication member 10 does not reach the duplication roller 91, the development image can reach the duplication roller 91 to deposit the toners onto the duplication roller 91. When such an erroneous operation occurs, a hair brush 92 removes the toner deposited on the duplication roller 91 so that the back surface of the duplication member 10 will not be polluted.

When the recording medium 10 rotates, the screws 610, 650 and 120, and the magnetic roll 60 rotate to supply a suitable amount of toner to the electrode 2.

A heater 33 centrally provided on the recording medium 3 can enhance the temperature of the recording medium 3 in a high moisture state to defumidify it, thereby providing a good image in the high moisture state as well as in a normal moisture state. The heater, which is centrally provided on the rotating recording medium 3, can be supported without being rotated; the heater 33 can be easily power-supplied without using e.g. a slip ring.

The electricity-removal brush 132 is brought into contact with the duplication member 10 after the toner image has been duplicated from the recording medium 3 by the action of the duplicating roller 91 but before it has reached the guide 131. The electricity-removal brush 132 is inclined in the moving direction of the duplication member 10 so that the duplication member 10 is smoothly brought into contact with the brush 132 and transferred onto the guide 131. This electricity-removal brush 132 permits excess charge on the duplication member 10, particularly in a low moisture state, to be removed so that the duplication member 10 in the low moisture state will never adhere to the guide 131 because of static electric force. Thus, duplication member 10 can be transferred to the fixing device (not shown) without disordering the duplication image 44 on the duplication member 10.

Now referring to FIGS. 2 to 5, explanation will be given for the effect of applying a slight voltage to the non-image electrode needles relative to that applied to the conductive layer of the recording medium.

Figure 2:
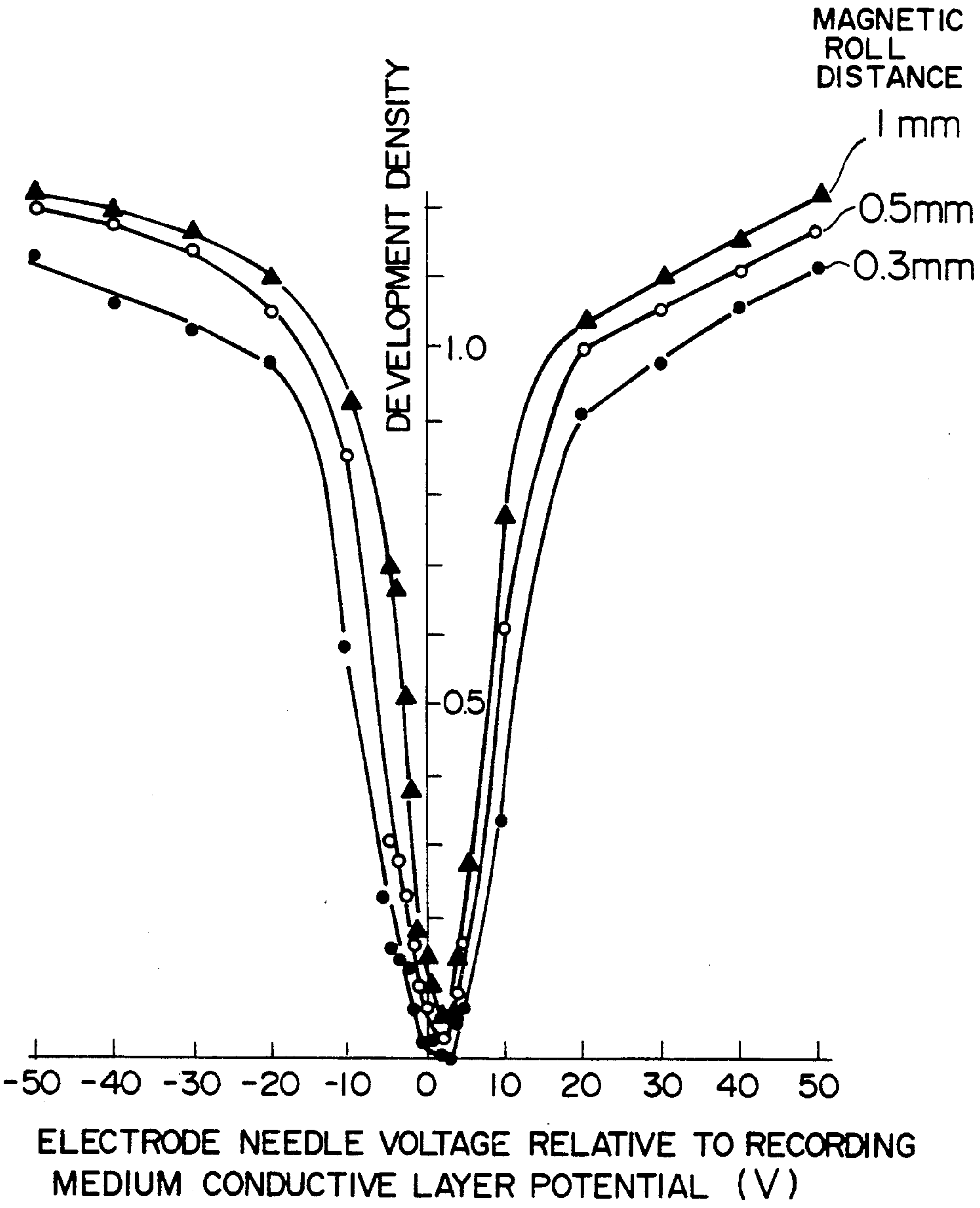
FIGS. 2 and 3 are graphs showing the relationship between a recording voltage and the voltage of the conductive layer of a recording medium, and a developing density.
Figure 3:
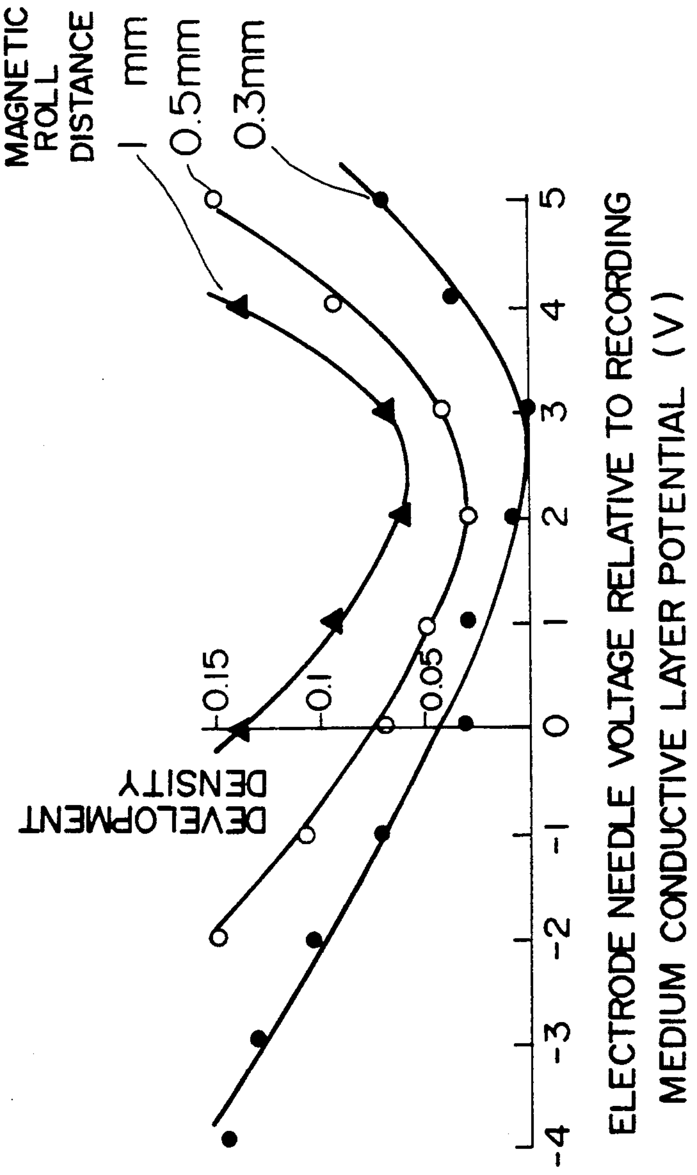

FIGS. 2 and 3 show one example of experimental data according to the present invention. FIG. 2 presents a graph showing the relationship between development density and the potential difference between the voltage applied to the electrode needles and the voltage applied to the conductive layer of the recording medium. FIG. 3 shows an enlarged view of FIG. 2 in the vicinity of the potential difference of 0 V. The development density means an optical reflection density; its higher value represents being near to dark black, while its lower value represents being near to white. Generally, it is desired that the reflection density at the printing portion (black portion) of a duplicated image or a printer output image be 1.0 or more. Also, the reflection density at the non-image portion (fog) is influenced by that of the duplication member itself such as paper on which an image is made; now ordinary paper is used.

In the experiment having the results of FIG. 2, the recording medium 3 was comprised the conductive layer 31 of aluminum with the insulating layer 32 of an anodic oxidation coating 10$\mu$ thick deposited thereon. The voltage of all the needles is varied in the range of $-50$ V to $+50$ V relative to that of the conductive layer 31 of the recording medium 3 to adhere toner onto the recording medium at the speed of 50 mm/sec.

The toner used in the experiment are made of acrylic resin covered with e.g. carbon and has an electric conductivity of $10^{-5}$ mho/cm.

Further, magnetic roll 60 has a surface magnetic flux density of 350±50 G, an outer diameter Φ of 14 mm and a rotation speed of 1000 rpm, and it is arranged so that its sleeve 600 is separated from the recording medium 3 by 0.3 mm, 0.5 mm or 1 mm. Then, among the toner deposited on the recording medium 3, the toner with a smaller adhesion force was removed by the action of the magnetic attractive force and the remaining toner with a larger adhesion force was used to provide the development image.

As seen from the graph of FIG. 2, the development density increases consistently with the absolute value of the electrode needle voltage; it becomes smaller in the vicinity of an electrode needle voltage of 0 V. Also, the development density preferably increases with the separation of the magnetic roll 60 from the recording medium 3 in the order of 0.3 mm, 0.5 mm and 1 mm. This is because further separation of the magnetic roll 60 from the recording medium 3 weakens the action of the magnetic field on the recording medium and so weakens the operation of removing toner.

However, as seen from FIG. 3, which is an enlarged view of FIG. 2 in the vicinity of 0 V, with the distance of the magnetic roll 60 from the recording medium being as long as 1 mm, the development density is higher and so the non-image density is also high, thereby providing a poor recorded image with more fog.

Further, it can be seen from FIG. 3 that the development density is lowest when the electrode needle voltage is not 0 V but slightly higher than the recording medium voltage, i.e. +2 V to +3 V, thereby providing a good image with less fog. The reason therefor will be explained with reference to FIGS. 4 and 5.

Figure 4:
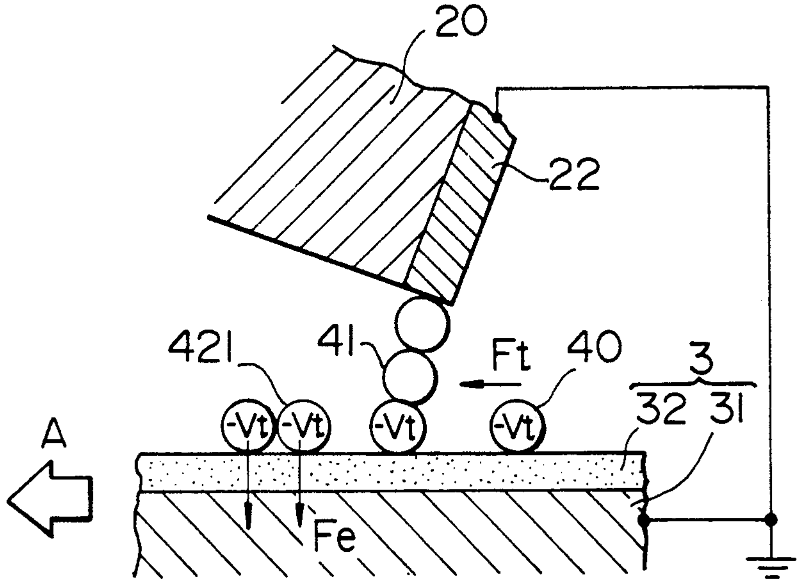
FIG. 4 (PRIOR ART)
FIGS. 4 and 5 are enlarged views of the main part of FIG. 1.
Figure 5:
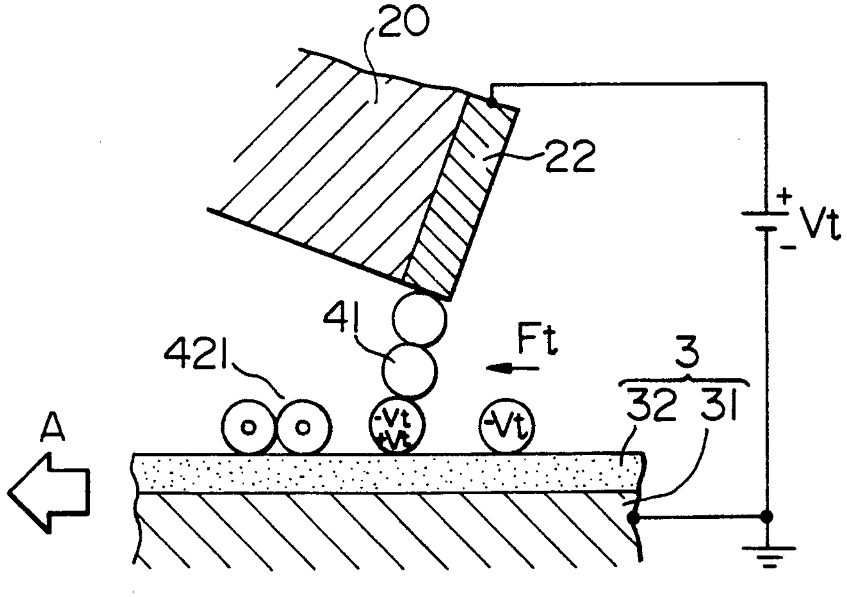

FIGS. 4 and 5 are enlarged views of FIG. 1 in the vicinity of the electrode 22. In FIGS. 4 and 5, like reference numerals designate like parts in FIG. 1. FIG. 4 relates to the prior art in which no voltage is applied to the electrode needle (i.e. the electrode needle voltage is 0 V), and the conductive layer 31 of the recording medium 3 is grounded, and therefore both are at the same potential. FIG. 5 relates to the present invention in which a slight voltage (+Vt of 2.5 V or so) is applied to electrode 22 and the conductive layer 31 is grounded.

In FIG. 4, the toner 40 within the hopper 11 is brought not contact with the surface of the insulating layer 32 of the recording medium 3 and frictionally engages with layer 32 due to rotation of the recording medium 3.

The toner is mainly made of high polymer resin with components of e.g. iron oxide or carbon added. The toner used in the present embodiment has a resistivity of $10^{10}$ Ω.cm or less. As a result of friction of the toner with the insulating layer 31, the toner is charged particularly in their resin portion, and the entire toner developes a surface potential of −Vt. The amount and polarity of the charging depends on the kind of the toner resin, the toner composition, the material of the insulating layer of the recording medium. It is usually −5 V to +5 V. This charging greatly influences the resultant image because the recording voltage is several tens of volts or so.

The toner 40 is friction-charged with a negative polarity when the recording medium 3 moves in the direction of arrow A. The charged toner is supplied to below the electrode needle grounded and is aligned in the gap between the electrode needle 22 and the recording medium 3. The aligned toner 41 is brought into contact with the electrode needle 22. However, the charge stored in the resin portion of the toner is not discharged, and so the toner has a charging potential of −Vt. Therefore, although the recording voltage has not been applied to the electrode needle 22, and so no potential difference occurs between the electrode needle 22 and the conductive layer 31 of the recording medium, a slight potential difference occurs between the toner 41 and the recording medium, thereby providing an electrostatic adhesion force Fe therebetween. The toner is adhered to the recording medium 3 owing to the adhesion force Fe. The toner 421 thus adhered to the surface of the recording medium 3 experiences a toner transfer force Ft which is generated with movement of the recording medium 3 to be transferred with the recording medium.

On the other hand, in the case of FIG. 5 where a slight voltage Vt having a polarity opposite to the charging potential of the toner has been applied to the electrode needle 22, the toner is not deposited on the recording medium 3. The reason therefor will be explained below. The toner is charged slightly negatively owing to friction charging so as to have a potential of −Vt. The charged toner is supplied below the electrode needle 22 and is aligned in the gap between the electrode needle 22 and the recording medium 3. The aligned toner 41 stores the charge +Vt in its conductive portion such as toner carbon. The charge −Vt due to the friction charging is apparently canceled by the charge +Vt injected from the electrode needle so that the toner 421 to be deposited will not undergo the electrostatic adhesion force.

As understood from the above explanation of FIGS. 4 and 5, the toner adhesion force disappears when the slight voltage is applied to the electrode needle so as to cancel the friction charge of the toner, but not when the potential difference between the electrode needle 22 and the conductive layer 32 of the recording medium is zero. Thus, the toner 421 deposited on the recording medium 3 can be most easily removed by the magnetic roll 60 with a small magnetic attraction force. Therefore, very little toner remains on the recording medium thereby to provide the lowest development density.

Figure 6:
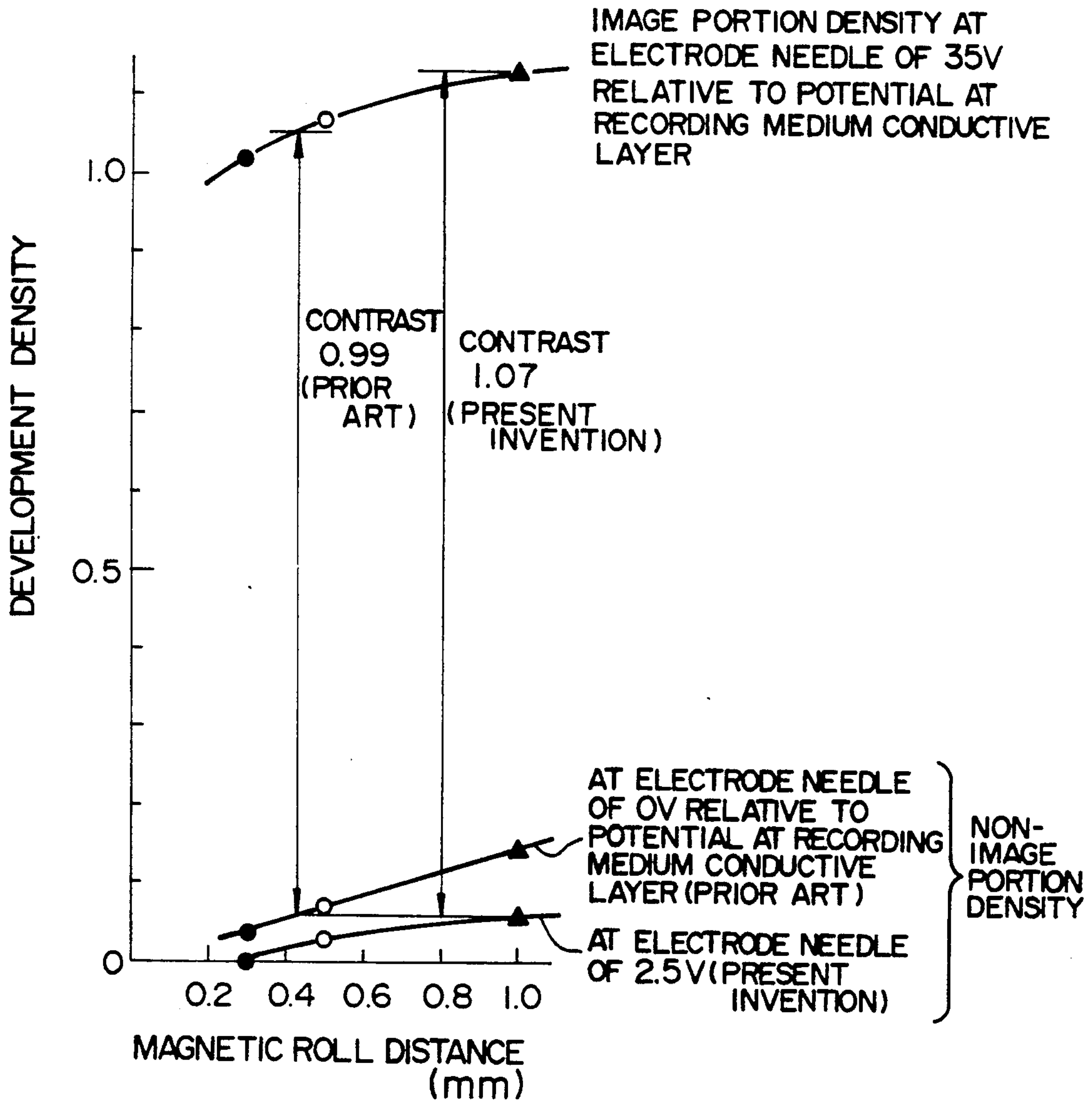
FIG. 6 is a characteristic graph showing the relationship between a magnetic roll distance and a developing density.

FIG. 6 shows the relationship between the development density in the ordinate and the distance between the magnetic roll and the recording medium in the abscissa on the basis of the results of FIGS. 2 and 3.

The non-image portion density is illustrated for both cases where relative to the potential at the recording medium conductive layer, the electrode needle voltage is 0 V (prior art) and is 2.5 V (present invention). The image portion density is illustrated for the case where the electrode needle is 35 V. As seen from FIG. 6, with a magnetic roll distance of 1 mm, the present invention provides the non-image portion density of 0.06 and the image portion density of 1.13, which results in a high contrast of 1.07. In order for the prior art to provide a non-image portion of 0.06, the magnetic roll distance must be decreased. The resultant image portion density is as low as 1.05 so that the contrast is also as low as 0.99.

As understood from the above explanation, in accordance with the present invention, it is possible to not only reduce the non-image portion density but also to enhance the image portion density by setting the magnetic attraction force of the magnetic roll 60 to a suitable value. Thus, an image recording apparatus which can provide a clear image with a high contrast free from fog can be provided.

Explanation will be given for more concrete embodiments of the present invention.

Embodiment 1

Under the same condition as in FIGS. 2 and 3, the electrode needle voltage is set for 0 V for the non-image portion and is set for 35 V for the image portion, and the recording medium conduction layer potential is set for −2.5 V by the voltage application means.

Embodiment 2

Under the same condition as in FIGS. 2 and 3, the recording medium conductive layer potential is set for 0 V, and the electrode needle voltage for the non-image portion is set for +2.1 V using the voltage application means. This embodiment will be explained with reference to FIG. 7.

Figure 7:
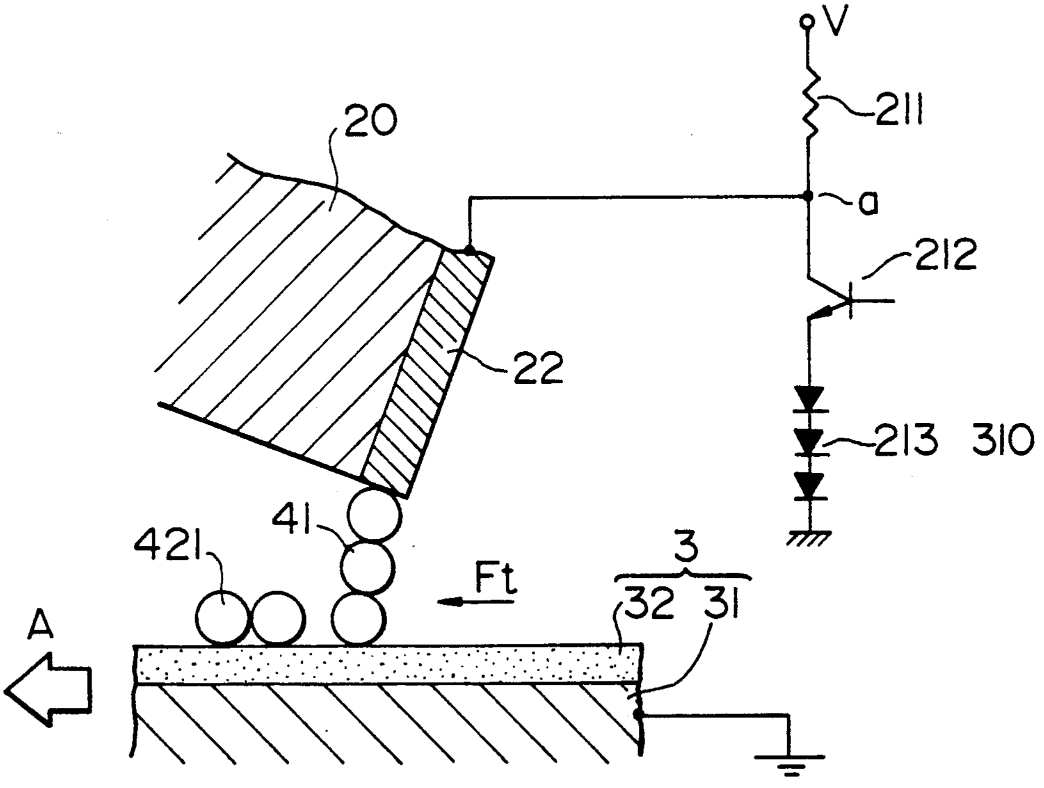
FIGS. 7, 8, and 9 are views showing other embodiments of the present invention, respectively.

In FIG. 7, like reference numerals designate like parts in FIG. 5, 211 is a resistor; 212 is a transistor; and 213 is a diode serving as voltage application means. If an image is to be formed by applying a recording voltage to the electrode needle 22 to charge the toner 41 by charge injection from the electrode needle 22 so as to cause the toner to be adhered to the recording medium 3, a signal voltage is not applied to the base of the transistor 212, and the transistor 212 is in an off state. Then, the electrode needle 22 is applied with substantially V volts even with a voltage drop across the resistor 211. When the transistor 212 is in an on state, the potential at point a is about 2.1 V owing to the voltage drop across the diode 213. Thus, the friction charge of the toner can be canceled and the toner for the non-image portion can be easily removed using the magnetic roll 60.

Embodiment 3

Under the same condition as in FIGS. 2 and 3, the electrode needle voltage is set for −35 V for the image portion and set for 0 V for the non-image portion, and the recording medium conductive layer voltage is set for −2 V to −3 V using the voltage application means. The third embodiment can provide a higher recording density than in the first and second embodiments.

Embodiment 4

Unlike the case of FIGS. 2 and 3, a toner that is positively charged because of friction charging is used, and the electrode needle voltage for the non-image portion is set for a negative potential relative to that of the recording medium conductive layer using the voltage application means.

Embodiment 5

Figure 8:
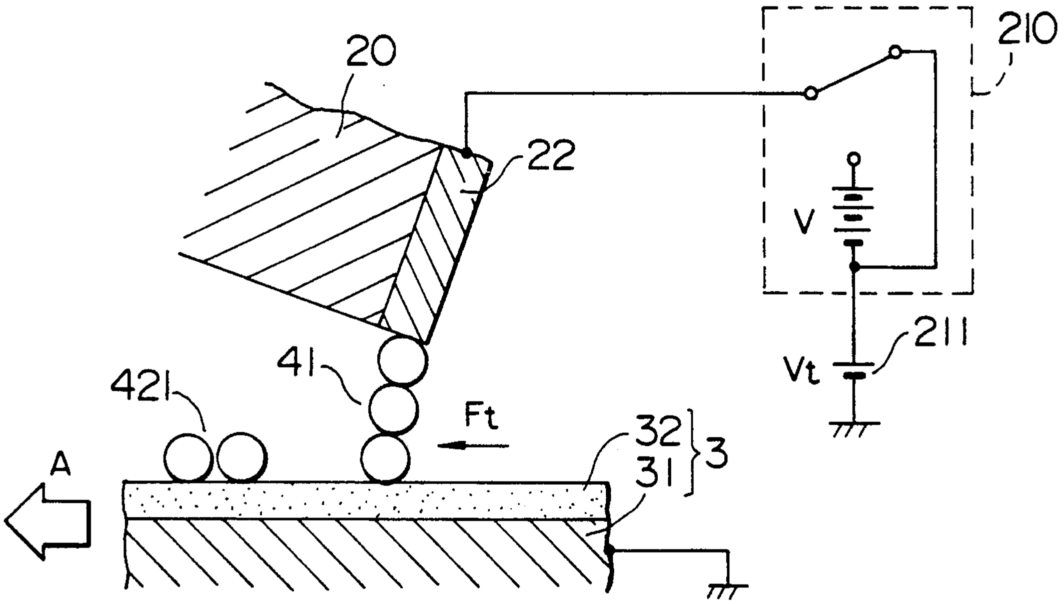

The recording medium conductive layer voltage is set for 0 V, and the entire driving circuit for applying the image recording potential and the non-image recording potential to the respective electrode needles is biased with the potential required to cancel the friction charging potential of the toner, e.g. −5 V to +5 V. FIG. 8 shows an arrangement of this embodiment. In FIG. 8, like reference numerals designate like parts in FIG. 5. 210 is a driving circuit and 211 is bias voltage application means. In this embodiment, under the same condition as in FIGS. 2 and 3, the bias voltage Vt is set for 2 V and the image recording potential is set for +35 V. In accordance with this embodiment, the potential required to cancel the friction charging potential of the toner can be easily applied to the non-image recording electrode needles.

Embodiment 6

Figure 9:
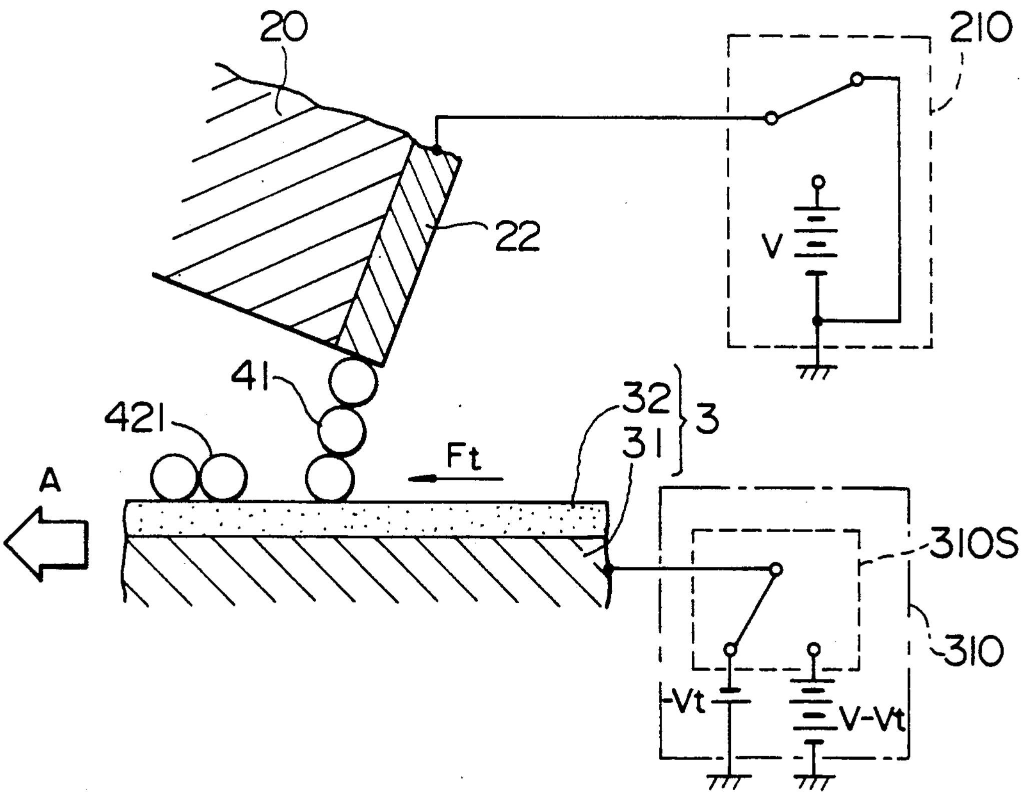

The relationship between the recording density, and the electrode needle potential for conductive toner and the recording medium conductive layer potential have been clarified as described previously. Using this relationship, fog of the non-image portion can be reduced and also sufficient density can be given to the image portion to provide a clear image. Further, an inverted image of black and white can be easily provided. FIG. 9 shows an arrangement of this embodiment.

In FIG. 9, like reference numerals designate like parts in FIG. 5. 210 is a driving circuit; 310 is voltage applying means; and 310S is a switch. The driving circuit 210 applies the image recording potential V or the non-image recording potential 0 V to the respective electrode needles 22 in accordance with an image signal. Switching the switch 310S changes the recording medium conductive layer potential between −Vt and V−Vt.

Under the same condition as in FIGS. 2 and 3, the image recording potential V is set for +35 V, and the recording medium conductive layer potential is set for −2 to −3 V (−Vt) and +32 to 33 V (V−Vt).

With the switch 310S in contact with the side of −Vt, application of the electrode needle voltage in accordance with the image signal by the driving circuit 210 provides a clear image as in Embodiment 1.

On the other hand, when the switch 310S has been brought into contact with the side of V−Vt, application of the same voltage to the respective electrode needles as in the case of the switch 310S in contact with the side of −Vt provides a clear black-white inverted image. The reason therefor is as follows. Since the recording medium conductive layer has been set for V−Vt, when the electrode needle 22 is at the non-image recording potential 0 V, the toners are adhered strongly to the recording medium thereby to record an image, and when the electrode needle 22 is at the image recording potential V, the friction charge of the toners is canceled to provide a white image with less fog.

Thus, switching the switch 310S can easily provide the black-white inverted image without changing the image signal.

Further, if the switch 310S is adapted to be operable from outside the image recording apparatus, the black-white inverted image can be also provided using the same image data through a simple operation in accordance with a user's demand.

Embodiment 7

If the voltage applied by the voltage applying means 310 is made to be operable from outside the image recording apparatus, the density of fog can be adjusted in accordance with the environment.

In accordance with the embodiments previously described, a clear image with less fog and high image density can provided.

The present invention clarifies the fact that in the image recording apparatus in which electrically conductive toner is charged by a recording electrode, fog of the image is due to the friction charging of the conductive toner, and positively using this fact reduces the fog to provide a clear image with a high image density.

Further, by taking into consideration the positional relationship in a friction charging order among the toners, the recording medium insulating layer 32 in contact therewith and the resist member for insulating the adjacent electrode needles, the amount and polarity of the friction charging can be stabilized to surely provide a clear image. The toner, when it is brought into contact with the recording medium insulating layer, the electrode needles and the resist member undergo friction charging. However, the electrode needles, which are made of a good electrical conductor, do not contribute significantly to the friction charging. Therefore, the amount and polarity of the friction charging of the toners can be stabilized by making the recording medium insulating layer and the resist member of the same material. If it is difficult to make both members of the same material, it is preferable to select materials which are close in the friction charging order.

Explanation will be given of concrete embodiments of selection of the materials of the recording medium insulating layer and the resist member for the recording electrode.

Embodiment 8

The recording electrode is composed of electrode needles of nickel and acrylic resin for insulating the electrode needles from one another; the recording electrode is arranged on a substrate of epoxy resin.

The recording medium is composed of an electrically conductive layer of aluminum and an insulating layer which is formed by anodic-oxidizing the surface of the conductive layer with the pores (formed by anodic-oxidizing) impregnated with acrylic resin by electrolytically deposited material electroplating acrylic resin thereon. The insulating layer may be formed by painting the acrylic resin on the metallic surface.

Embodiment 9

The recording electrode is formed as follows. The surface of an aluminum plate is anodic-oxidized and etched using alkaline solution to form a thin plate of the anodic oxidized film. This thin plate is applied to the side of electrode needles of the recording electrode with the tip of the needles being exposed.

The recording medium is composed of an electrically conductive layer and an insulating layer formed by anodic-oxidizing the surface of the conductive layer and sealing the pores by high pressure steam treatment.

In this embodiment, the same material as the recording medium insulating layer is used for the resist member for the recording electrode. If it is difficult to select the same material or materials having positions close to each other in the friction charging order for the resist member for the recording electrode and the recording medium insulating layer, this embodiment permits the amount and polarity of the friction charging of toners to be easily stabilized.

Further, if the electrode protection member 24 is used on the recording electrode as in the embodiment of FIG. 1, it is preferable to select, as the material of the protection member, the same material as that of the recording medium insulating layer or material close to the latter in the friction charging order.

The image recording apparatus according to the present invention can be applied to a facsimile, a printer and a copy machine having a scanner and is suitable to provide an image free from fog.

We claim:

1. An image recording apparatus comprising:

a recording electrode having electrode needles aligned in columns;

a driving circuit for individually applying an image recording potential and a non-image recording potential to said electrode needles;

a recording medium composed of an insulating layer with an electrically conductive layer on the surface thereof;

voltage applying means for applying a D.C. potential to said conductive layer relative to the non-image recording potential, whereby electrically conductive toner is supplied between said recording electrode and said recording medium, said driving circuit individually applying an image potential to said electrode needles to record a toner image on said recording medium.

2. An image recording apparatus according to claim 1, wherein said voltage applying means applies a D.C. potential of −5 V to +5 V.

3. An image recording apparatus comprising:

a recording electrode having electrode needles aligned in columns;

a recording medium composed of an insulating layer with an electrically conductive layer on the surface thereof;

means for supplying electrically conductive toner between said recording electrode and said recording medium;

a driving circuit for individually applying an image recording potential and a non-image recording potential to said electrode needles to provide a toner image on said recording medium; and bias voltage applying means for adding a bias voltage to said image recording potential and said non-image recording potential relative to said electrically conductive layer.

4. An image recording method for use in an image recording apparatus comprising a recording electrode having electrode needles aligned in columns; a recording medium composed of an insulating layer with an electrically conductive layer on the surface thereof; and a driving circuit for individually applying an image recording potential and a non-image recording potential to said electrode needles to provide a toner image on said recording medium; said image recording method comprising the steps;

supplying electrically conductive toner between said recording electrode and said recording medium;

activating said driving circuit to individually and selectively apply an image recording potential and a non-image recording potential to said electrode needles to record a toner image on said recording medium; and applying a biasing potential to said electrically conductive layer to cause the potential at said electrically conductive layer to be relatively different from the image recording voltage and the non-image recording voltage.

5. An image recording method according to claim 4, wherein said bias potential applying means causes the potential difference between the recording potential and the potential at said electrically conductive layer to be larger than the potential difference between the non-image recording potential and the potential at said electrically conductive layer.

6. An image recording method according to claim 5, wherein the potential difference between the non-image recording potential and the potential at said electrically conductive layer is 0 V to +5 V.

* * * * *